US006801609B2

(12) United States Patent
Fullarton et al.

(10) Patent No.: US 6,801,609 B2
(45) Date of Patent: Oct. 5, 2004

(54) TELEPHONE SYSTEM WITH PROGRAMMABLE LINE APPEARANCES

(75) Inventors: Sonya Fullarton, Ottawa (CA); Debbie Pinard, Kanata (CA)

(73) Assignee: Mitel Knowledge Corporation (CA)

( * ) Notice: Subject to any disclaimer, the term of this patent is extended or adjusted under 35 U.S.C. 154(b) by 537 days.

(21) Appl. No.: 09/843,409

(22) Filed: Apr. 26, 2001

(65) Prior Publication Data

US 2002/0031211 A1 Mar. 14, 2002

(30) Foreign Application Priority Data

Apr. 28, 2000 (GB) .............................................. 0010267

(51) Int. Cl.$^7$ ............................ H04M 3/42; H04M 1/00
(52) U.S. Cl. .............. 379/201.02; 379/156; 379/265.04
(58) Field of Search ........................... 379/201.02, 156, 379/157, 201.12, 207.02, 265.04

(56) References Cited

U.S. PATENT DOCUMENTS

| 5,255,314 A | | 10/1993 | Applegate et al. ..... 379/212.01 |
| 5,392,346 A | * | 2/1995 | Hassler et al. ......... 379/265.04 |
| 5,572,572 A | | 11/1996 | Kawann et al. .......... 379/90.01 |
| 5,638,494 A | | 6/1997 | Pinard et al. |
| 5,657,377 A | | 8/1997 | Pinard et al. |
| 5,757,897 A | * | 5/1998 | LaBarbera et al. ......... 379/165 |
| 5,884,032 A | | 3/1999 | Bateman et al. |
| 5,999,965 A | | 12/1999 | Kelly |
| 6,026,087 A | | 2/2000 | Mirashrafi et al. |

FOREIGN PATENT DOCUMENTS

| EP | 0330441 | 8/1989 |
| EP | 0399723 | 11/1990 |
| EP | 0602856 | 6/1994 |
| WO | 0025464 | 5/2000 |

OTHER PUBLICATIONS

U.K. Search Report dated Nov. 21, 2000.

* cited by examiner

Primary Examiner—Benny Tieu
(74) Attorney, Agent, or Firm—Jones Day

(57) ABSTRACT

A telephone system for permitting multiple users to log in to a plurality of line appearances on a multi-line telephone set in order to access personalized services associated with individual user profiles for the users. The telephone set is provided with individual displays and message notification lights for the individual line appearances. Users identify themselves by logging in to a particular line appearance via telephone key input of user name and password, or other suitable log in function.

8 Claims, 4 Drawing Sheets

TELEPHONE SYSTEM WITH PROGRAMMABLE LINE APPEARANCES

FIELD OF THE INVENTION

This invention relates in general to telephone systems, and more particularly to a telephone system with programmable line appearances.

BACKGROUND OF THE INVENTION

Telephones with multiple line appearances are well known. When such telephones are shared by several users in a work environment, each line appearance may be associated with an individual user. Thus, for example, a single telephone set may be used at a nurse's station of a hospital, whereby individual line appearances are used by different nurses.

Unfortunately, such prior art systems do not provide personalized services, such as voice mail, etc., for the individual users. Normally, only the prime number (i.e. line appearance) is provided with enhanced call features such as voice mail, message notification, speed dial, etc. Also, only a limited number of line appearances are available o an individual telephone, which may not coincide with the number users requiring use of the telephone during different time periods. For example, where the users (e.g. nurses) work different shifts, it would be highly desirable to assign a particular line appearance for the purpose of providing personalized services, to several users who work different shifts.

SUMMARY OF THE INVENTION

According to the present invention, multiple users are able to log in to a plurality of line appearances on a multi-line telephone set in order to access personalized services associated with individual user profiles for the users. Preferably, the telephone is provided with individual displays and message notification lights for the individual line appearances. Users identify themselves by logging in to a particular line appearance via telephone key input of user name and password, or other suitable log in function. Thus, the system of the present invention is particularly useful in work environment where transients workers require access to personalized telephony services through a single telephone set. Examples of such work environments include hospital nurse stations, laboratories, etc.

BRIEF DESCRIPTION OF THE DRAWINGS

A detailed description of the preferred embodiment of the present invention is provided herein below, with reference to the following drawings in which.

DETAILED DESCRIPTION OF THE PREFERRED EMBODIMENT

Figure 1:
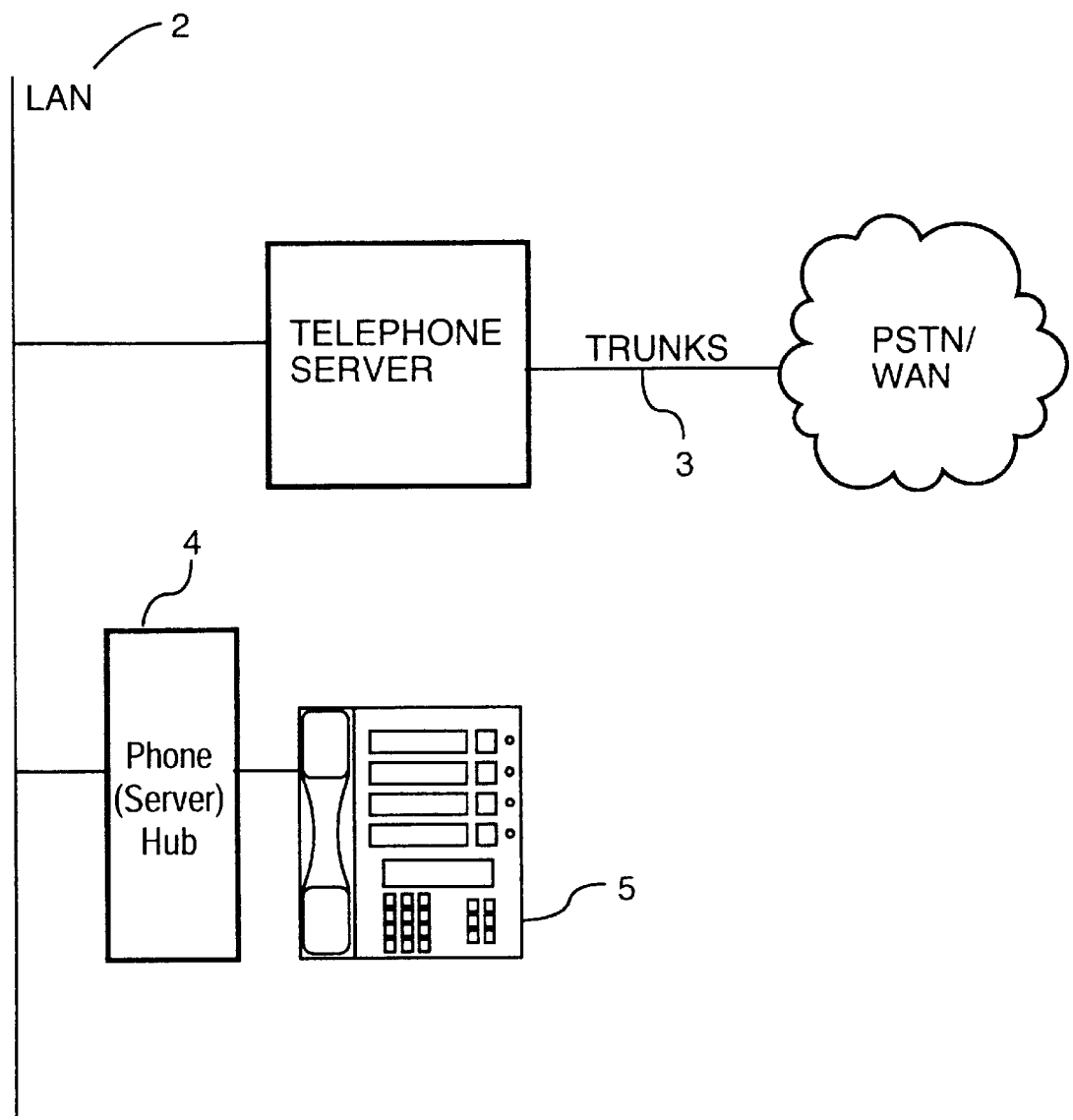
FIG. 1 is a block diagram of a communications system for realizing the telephone with programmable line appearances according to the present invention.

With reference to FIG. 1, a communication system is shown comprising a telephony server 1, preferably in the form of a Windows® NT based PBX, interconnecting a plurality of communications endpoints which are connected via a LAN 2 and voice/data trunks 3 to an outside PSTN/WAN or the Internet. An example of a suitable telephony server 1 is set forth in U.S. Pat. No. 5,657,446 entitled "Local Area Communications Server", the contents of which are incorporated herein by reference. A phone hub 4 is connected to the LAN 2, with one or more telephones 5 connected to the hub. Typically, a large plurality of telephone, desktop PCs, etc., are connected to the LAN 2 via multiple hubs (e.g. phone hub 4, and other data hubs, etc.), although the simplified representation of FIG. 1 shows only a single phone hub and telephone connected thereto.

Figure 2:
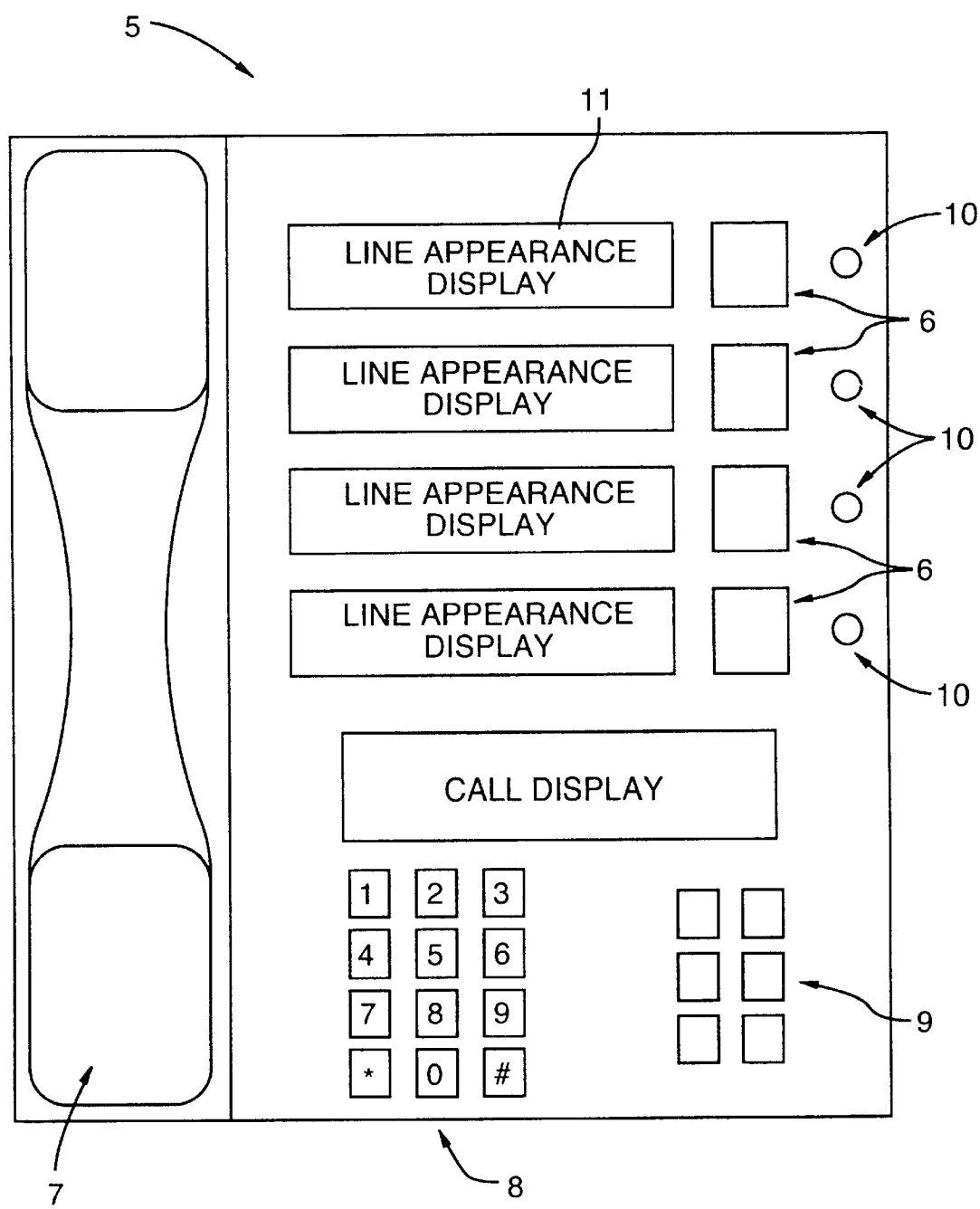
FIG. 2 is a schematic representation of a telephone set according to a preferred embodiment of the invention.

FIG. 2 shows a representative telephone set 5 having multiple line appearances, indicated by illuminating line appearance buttons 6, a handset 7, key pad 8, function keys 9, message waiting lamps 10 and individual line appearance displays 11. The layout of the telephone may be different from that shown in FIG. 2. Likewise, enhanced features such as function keys 9, displays 11, etc. are optional. A single message lamp 10 may be used, with different flash cadences or colors to identify different users. Indeed, it is contemplated that the phone 5 may be implemented via an IP phone application on a personal computer, with appropriate graphical user interfaces for implementing the various features.

Figure 3:
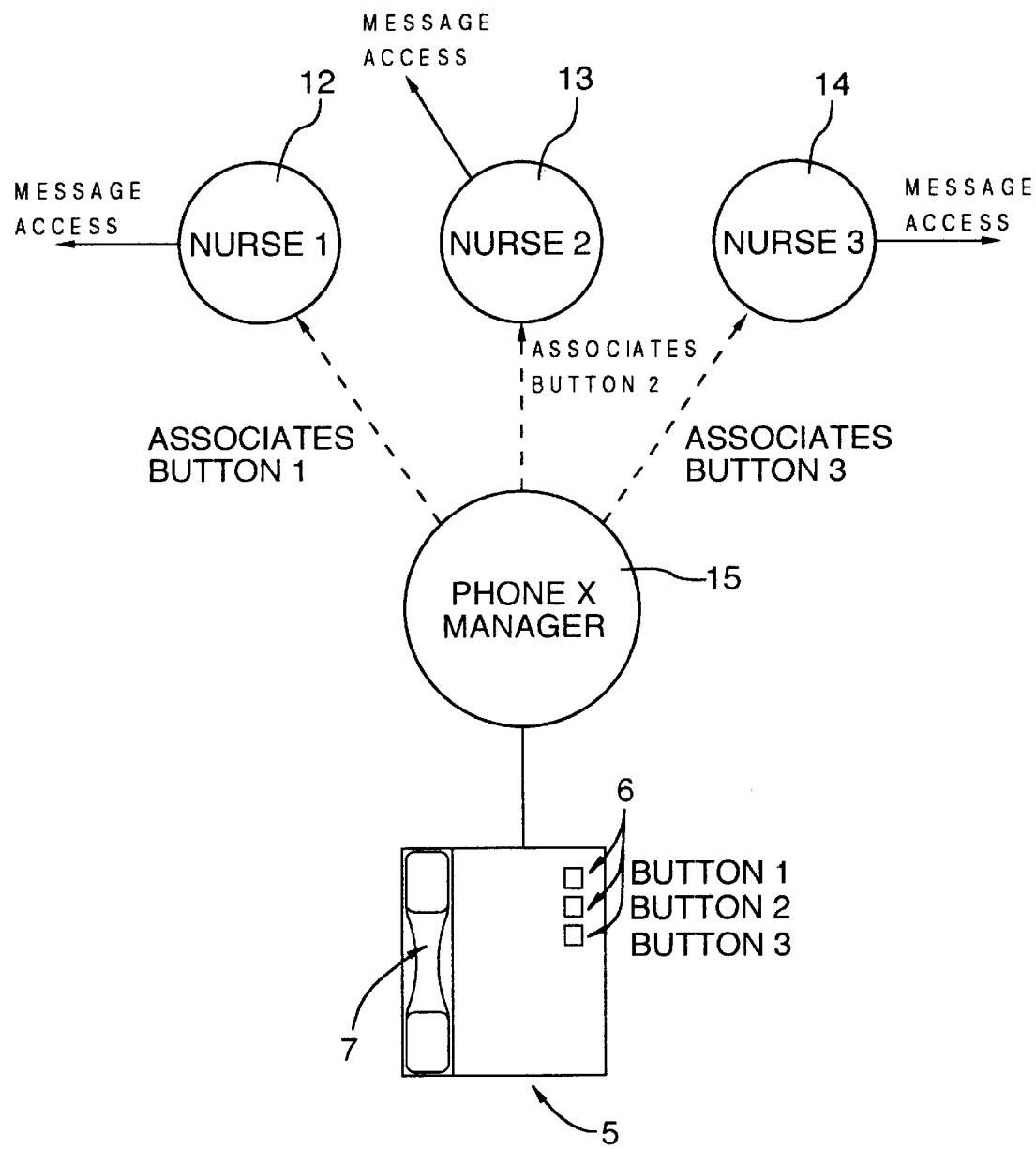
FIG. 3 is a block diagram showing various software agents interacting with the telephone set for implementing personalized telephony features according to the preferred embodiment.

FIG. 3 shows various software agents which reside in one or both of the telephony server 1 and/or phone hub 4. Agents 12, 13 and 14 represent individual users and contain user profiles and other executable code for defining individual allowed classes of service, message access functionality, speed call preferences, and other personalized telephony services. The agents are able to access personalized messages via a centralized messaging system, as well as perform other proxy functions on behalf of the individual users. A phone manager agent 15 is provided for each phone 5, for dynamically assigning individual buttons 6 to respective user agents 12, 13, 14, etc. The phone manager 15 is entirely responsible for all telephony functions associated with its associated phone 5. The phone manager 15 is a state machine that keeps track of all buttons and displays on the telephone set 5. The structure and operation of the phone agent and user agents is as set forth in U.S. Pat. No. 5,638,494 entitled "Adaptive Communication System", the contents of which are incorporated herein by reference.

Figure 4:
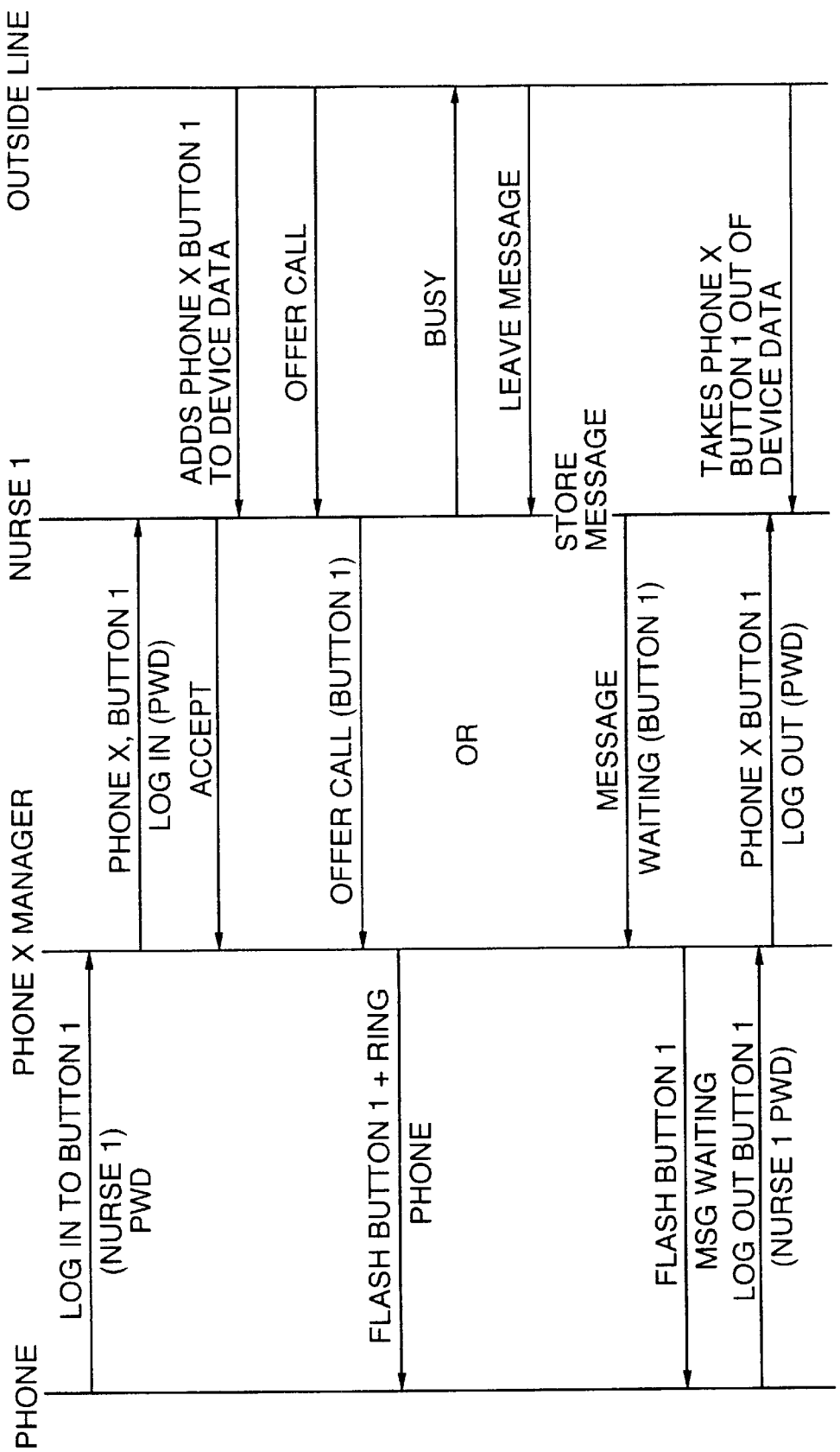
FIG. 4 is a message flow diagram showing communication between the various software agents for implementing the personalized telephony features.

In operation, with reference to FIG. 4, a user logs in to a predetermined one of the line appearances 6 on telephone set 5 using any appropriate login procedure (e.g. using soft or hard keys on the telephone set to enter a password, etc.) The phone manager 15 passes the login request to the indicated user agent 12, 13 or 14 for authentication. Once the user agent accepts the login, the indicated line appearance button is added to the device data within phone manager 15. Once logged in to a particular line appearance 6, that line appearance takes on the user's assigned telephone number and features in accordance with the user's profile, as set forth in U.S. Pat. No. 5,657,377, entitled Portable Telephone User Profiles, the contents of which are incorporated herein by reference.

Thus, for example, if a call to the user's telephone number is received via outside line 3, the user agent 12, 13 or 14, associated with that number presents the call to the phone manager 15, provided that the user is not already busy. If a line is available on the telephone 5, the phone manager flashes the appropriate line appearance 6 and rings the telephone. If the user is busy when the call arrives, the caller may be requested to leave a voice mail message. The message is then stored in a database associated with the user agent, which then notified the phone manager 15 that a message is waiting. The phone manager 15 then flashes the appropriate message waiting lamp 10.

At the end of the user's work shift the user logs out, in response to which the allocated line appearance 6 is removed from the device data by phone manager 15.

It will be appreciated that the message sequence of FIG. 4 is intended to be illustrative of only one call scenario. An infinite number of call scenarios are possible, all of which are implemented using similar message sequences between the phone manager and user agents and affected hardware devices (phone, lines, call forward agents, etc.)

It will be appreciated that, although a particular embodiment of the invention has been described and illustrated in detail, various changes and modifications may be made. For example, the time that a user remains logged in to a line appearance may be made programmable (one hour, one day, permanently, etc.), after which the system automatically logs the user out of the line appearance. All such changes and modifications may be made without departing from the sphere and scope of the invention as defined by the claims appended hereto.

What is claimed is:

1. A telephone system with multiple programmable line appearances, comprising:

a telephony server for providing personalized communications services;

a telephone set having a plurality of line appearances; and a plurality of software agents for logging individual users having respective predetermined user profiles into respective ones of said line appearances such that an individual user, when logged in, is provided with access via a respective line appearances to predetermined ones of said personalized communications services of said telephony server in accordance with a user profile respective of said individual user;

said plurality of software agents further provided for logging said individual user out of said respective line appearance such that another individual user is provided, when logged in, with access via said respective line appearance to predetermined ones of said personalized communications services in accordance with a user profile respective of said another individual user.

2. The telephone system of claim 1, further comprising at least one of an external communications line and an internal communications line over which said telephony server provides said personalized communications services.

3. The telephone system of claim 2, wherein said external communications line is connected to the Public Switched Telephone Network (PSTN).

4. The telephone system of claim 2, wherein said external communications line is connected to the Internet.

5. The telephone system of claim 2, wherein said internal communications line is a Local Area Network (LAN).

6. The telephone system of claim 2, wherein said internal communications line is a Wide Area Network (WAN).

7. The telephone system of claims 4, further comprising at least one phone hub for connecting said telephone set to said telephony server via said LAN.

8. The telephone system of claim 7, wherein said plurality of software agents are implemented in a least one of said telephony server and said phone hub and include a phone manager agent for controlling said telephone set and a plurality of user agents representing said individual users and containing said user profile.

* * * * *